United States Patent [19]
Relin et al.

[11] Patent Number: 5,201,877
[45] Date of Patent: Apr. 13, 1993

[54] SUCTION TRANSPORTING DEVICE

[76] Inventors: Arkadi Relin, 2301 Woodward St., Apt. A-14; Anatole Milstein, 3 Covered Bridge Path, both of Philadelphia, Pa. 19115

[21] Appl. No.: 874,122

[22] Filed: Apr. 24, 1992

[51] Int. Cl.$^5$ .................... B65G 53/66; B65G 53/24
[52] U.S. Cl. .................................. 406/85; 406/93;
406/151; 406/192; 15/404; 417/306; 251/121;
37/317; 37/320; 37/321
[58] Field of Search .................. 406/85, 93, 113, 115,
406/151, 192; 15/375, 421, 404; 37/58, 59, 61;
417/290, 295, 306; 137/893; 251/121

[56] References Cited

U.S. PATENT DOCUMENTS

| | | | |
|---|---|---|---|
| 1,106,231 | 8/1914 | Marshall | 15/421 X |
| 1,508,521 | 9/1924 | Kreuser | 37/58 |
| 2,096,595 | 10/1937 | Sanford | 37/58 |
| 2,644,400 | 7/1953 | Hofer | 37/58 X |
| 2,889,779 | 6/1959 | Hofer | 37/58 X |
| 3,039,463 | 6/1962 | Dickey, Jr. et al. | 15/421 X |
| 3,107,386 | 10/1963 | Mandin | 15/404 X |
| 3,109,377 | 11/1963 | Hofer | 37/58 X |
| 3,111,778 | 11/1963 | Fonnesbeck | 37/58 |
| 3,263,615 | 8/1966 | Hofer | 37/58 X |
| 3,301,606 | 1/1967 | Bruno | 406/85 |

FOREIGN PATENT DOCUMENTS

| | | | |
|---|---|---|---|
| 1183621 | 10/1985 | U.S.S.R. | 37/58 |
| 1348461 | 10/1987 | U.S.S.R. | 37/58 |
| 525744 | 9/1940 | United Kingdom | 37/58 |

*Primary Examiner*—Charles A. Marmor
*Assistant Examiner*—James M. Kannofsky
*Attorney, Agent, or Firm*—I. Zborovsky

[57] ABSTRACT

A suction transporting device for transporting a material has a suction unit, a transporting line connected with the suction unit and having an inlet for receiving a material to be transported and an outlet for discharging the material to be transported and a unit for modulating a suction force of a suction produced in the transporting line by the suction unit, the modulating unit including a passage adapted to communicate the interior of the transporting line with atmosphere, an adjusting element operative for adjusting an initial area and shape of a minimal cross-section of the passage, and a valve mechanism including a drive, a speed controller for controlling a speed of the drive, and a valve body connected with the drive and cooperating with the passage so that when the valve body is displaced by the drive, an initial area and shape of the minimal cross-section of the passage is periodically changed.

4 Claims, 2 Drawing Sheets

SUCTION TRANSPORTING DEVICE

BACKGROUND OF THE INVENTION

The present invention relates to a suction transporting device. More particularly, it relates to a suction transporting device which uses a suction force for transporting solid or liquid particles by a carrying agent.

Suction transporting devices of the above mentioned general type are known in the art. In known transporting devices air or water from the environment are normally used as carrying agents. One example of a transporting device of this type using air as a carrying agent for transporting solid or liquid particles is a dry-wet vacuum cleaner. As an example of a suction transporting device using water as a carrying agent for transporting solid particles is a suction dredge. A suction transporting device basically includes a source of suction for example a fan driven by an electric motor and a transporting line formed as a hollow elongated body. The device may also have a suction nozzle attached to the front end of the transporting line and adapted to intake the carrying agent with the material to be transported. The efficiency of transporting when using such a suction device is determined primarily by a magnitude of a suction force which it develops at the surface from where the material to be transported is taken in by the suction nozzle. The strongest suction force in a particular suction device is obtained when the edge of the suction nozzle has a good contact with the surface. However, due to a strong suction force developed by such a nozzle, it sticks to the surface and as a result it becomes very difficult and sometimes impossible to move the nozzle along the surface.

Various means are used to reduce sticking and to achieve better mobility of a suction nozzle. For example, special parts are made in the edges of the nozzle, or the nozzle is kept elevated above the surface. When cutting or elevating of the suction nozzle is not desirable, an adjustable slot with a valve body is made in the wall of the transporting line as disclosed for example in the U.S. Pat. No. 3,048,876. The above means increases the mobility of the suction nozzle, but at the same time, permanently reduces the suction force at the surface where the material is being taken, and therefore permanently decrease the efficiency of a suction transporting device during operation.

SUMMARY OF THE INVENTION

Accordingly, it is an object of the present invention to provide a suction transporting device wherein sticking of a suction nozzle to a surface is eliminated and as a result the efficiency of the device is increased.

It is also another object of the present invention to provide a suction transporting device which creates an agitating effect on the surface where the material to be transported is accumulated.

In keeping with these objects and with others which will become apparent hereinafter, one feature of the present invention resides, briefly stated, in a suction transporting device for transporting a material, which has suction means; a transporting line connected with said suction means and having an inlet for receiving a material to be transported and an outlet for discharging the material to be transported; and means for modulating a suction force of a suction produced in said transporting line by said suction means, said modulating means including a passage adapted to communicate the interior of said transporting line with atmosphere, an adjusting element operative for adjusting an initial area and shape of a minimal cross-section of said passage, and a valve mechanism including a drive, speed controller for controlling a speed of said drive and a valve body connected with said drive and cooperating with said passage so that when said valve body is displaced by said drive an initial area and shape of the minimal cross-section of said passage is periodically changed.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

FIG. 2b is a section of the modulator taken along the line II—II of FIG. 2a;

DESCRIPTION OF THE PREFERRED EMBODIMENTS

Figure 1:
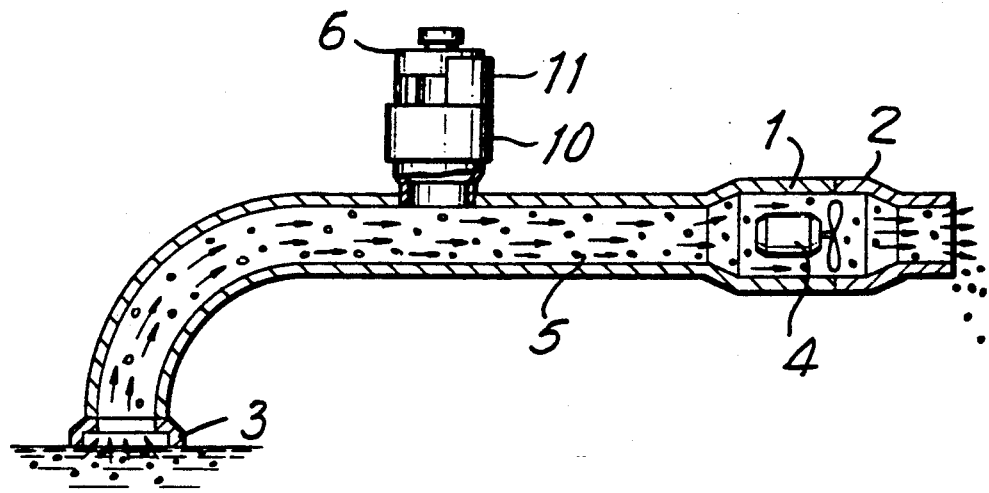
FIG. 1 is a view showing a longitudinal section of a suction transporting device in accordance with the present invention.

A suction transporting device in accordance with one embodiment of the present invention is shown in FIG. 1 and has a suction line 1 and a pumping line 2. The suction line 1 has a suction nozzle 3, a source of suction formed for example as a fan with a motor 4, and a hollow body 5 connecting the suction nozzle 3 with a source of suction 4. When the suction transporting device is used for vacuum cleaning, it is normally supplied with a container or a bag for collecting transported particles. Such means are generally known and therefore not shown in the drawings.

The disclosed suction transporting device also has a modulator of suction force identified as a whole with reference numeral 6. The modulator has a housing 7 with an inlet 9 which communicates the interior of the modulator with the environment, and a hollow member 8 which connects the interior of the housing 7 with the interior of the suction line 1. The modulator includes a valve element for adjusting a shape and dimensions of the inlet 9. The valve element includes valve members 10 and 11. In the shown embodiment the valve member 10 is formed as a closed ring with the height equal to the height of the inlet 9, while the valve member 11 is formed as a ring with a cutout. The valve member 10 is longitudinally displaceable relative to the housing 7 or in particular is displaceable in the direction of an axis of the housing 7. The valve member 11 is turnable and longitudinally displaceable relative to the axis of the housing 7.

The modulator 6 has a body 12 which is arranged inside the housing 7 and has an inlet opening 13 in its wall and a plurality of holes 14 in its bottom. A drive 15 formed for example as an electric motor is connected with the bottom of the body 12 and turns the latter. The drive 15 has a regulator 16 for regulating its velocity. The slot in the valve member 11, the inlet 9 of the housing 7, the opening 13 in the valve body 12, the holes 14 in the valve body 12 and the center opening of the member 8 together form a passage which communicate the interior of the suction line 1 with atmosphere. It should be emphasized that the drive for the valve body 12 can be formed in a different manner, such as for example by a pneumatic or hydraulic motor, a small turbine actuated by a flow of substance incoming from the environment through a small additional adjustable opening in the housing of the modulator, etc. The valve body 12 can be also formed differently, for example as an electromagnetic valve provided with means for regulating the frequency and the duration of time of its opening.

Figure 3:
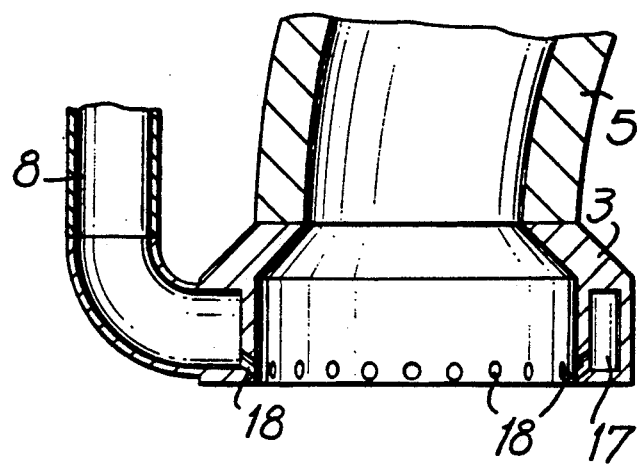
FIG. 3 is a view showing a section of a suction nozzle in accordance with another embodiment of the present invention.

The suction nozzle 3 in accordance with another embodiment of the invention is shown in FIG. 3 and provided with a hollow, closed channel 17. Its shape corresponds to the shape of the bottom of the suction nozzle 3. The channel 17 has a plurality of passages 18 extending through its internal wall into the interior of the suction line at the nearest proximity of the bottom of the suction nozzle 3. The channel 17 is connected with the interior of the modulator 6 by the member 8.

Figure 2A:
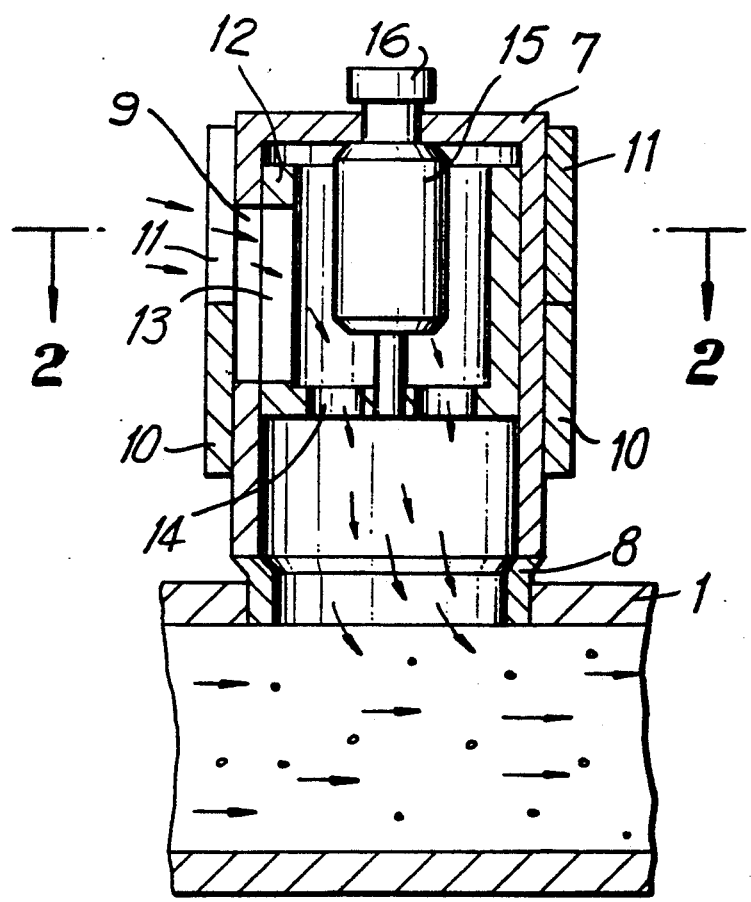
FIG. 2a is an enlarged vertical section of a suction force modulator of the inventive suction transporting device.
Figure 2B:
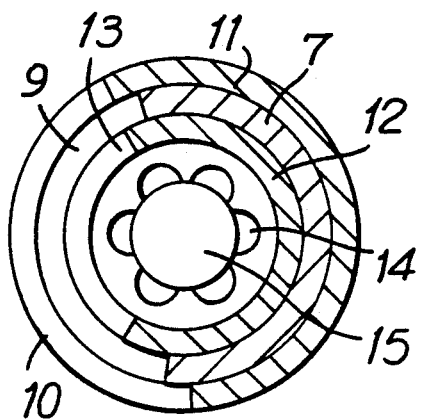
Figure 4:
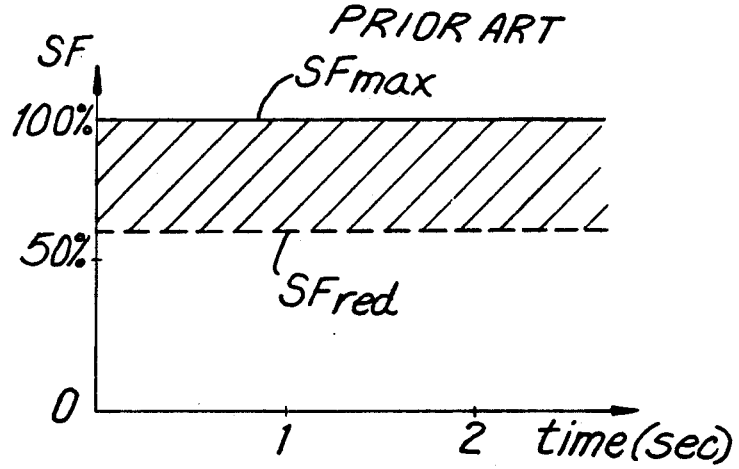
FIG. 4 is a view showing a graph of a maximum suction force and a reduced suction force as a function of time for a conventional suction transporting device.

The operation of the suction transporting device in accordance with the present invention is as follows:

When the suction transporting device is in an inoperative position the pressure in the suction line 1 and in the environment is the same. When the source of suction 4 is turned on, the pressure in the suction line 1 becomes lower than the pressure in the environment. The carrying agent shown in FIG. 1 with small arrows is sucked from the environment under the nozzle 3, intaking the particles of the material which is accumulated on the surface to which the suction nozzle 3 is applied as shown by the small circles in FIG. 1. When the modulator 6 is in an inoperative position, the suction transporting device operates in a conventional manner. In this case the drive 15 is turned off and opening 13 of the valve body 12 is positioned against the inlet 9. The inlet 9 can be completely or partially opened by actuating either the member 10 or the member 11, to provide a desirable permanent suction force reduction. When the inlet 9 is open, the matter (e.g. air) from the environment travels through the inlet 9, the opening 13, the holes 14, and the joint hollow member 8 into a suction line 1 as shown in FIG. 2a. In the second embodiment shown in FIG. 3, the matter from the environment travels through the members 9, 13, 14 and 8 and through the channel 17 and the passages 18 and comes into the suction line 1. The matter incoming from the environment is normally a carrying agent as in conventional vacuum cleaners. In case of a suction dredge, this matter can be air or water depending on where the modulator is installed. When the inlet 9 is permanently open the suction force is permanently reduced. This is shown graphically in FIG. 4. The lines $F_{max}$ and $F_{red}$ represent the suction force at the closed and opened inlet 9 respectively. The shaded area between two lines shows loss of the efficiency of transportation during the time of operation as in a conventional device.

Figure 5:
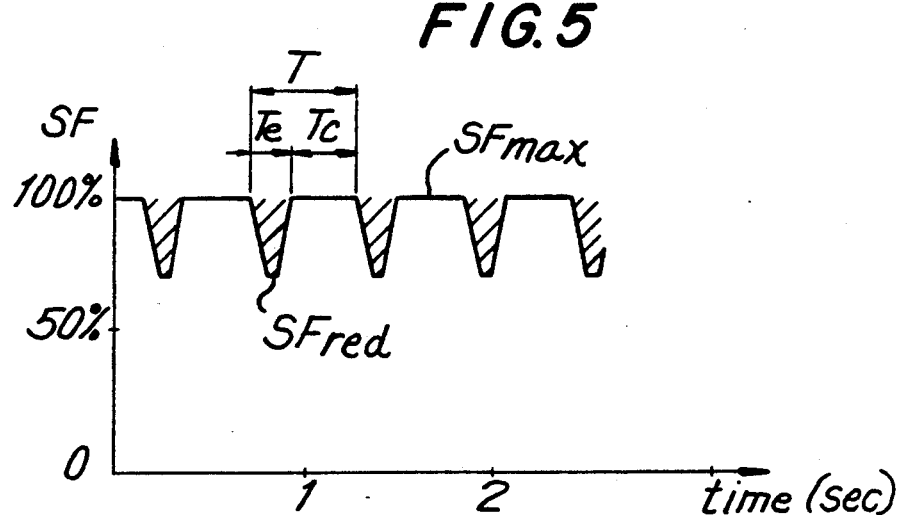
FIG. 5 is a view showing a graph of a variation of the suction force with time in the suction transporting device in accordance with the present invention.

FIG. 5 graphically illustrates the operation of the modulator 6 in accordance with the inventive suction transporting device where the drive 15 is turned on and the valve body 12 is rotated. The curve SF shows the variation of a suction force as a function of time. The time T is a period of one cycle of the curve and corresponds to one revolution of the valve body 12. Within the period T the modulator 6 is open during the time of exposition $T_e$ and closed for the rest of the period. During the time of exposition when the opening 13 of the valve body 12 passes along the inlet 9, the carrying agent can travel from the environment through the inlet 9 and the opening 13 into the interior of the modulator and further through the holes 14 and the member 8 into the interior of the transporting line 1. During this part of a cycle the suction force declines from its maximum when the inlet 9 was completely closed, reaches its minimum when the inlet 9 is completely open and returns back to its maximum after the opening 13 has passed the inlet 9 and it is closed again by the valve body 12. During the rest of the cycle ($T_c$) the inlet 9 remains closed, the carrying agent can enter the transporting line only through the suction nozzle 3, and the suction force remains at its maximum value until the opening 13 starts passing by the the inlet 9 and the new cycle begins. The shaded areas in FIG. 5 represent the loss of efficiency of transporting during those parts of the cycles when the modulator 6 is open.

The total efficiency loss in the disclosed transporting device is significantly less than in the conventional device since the suction force is reduced not permanently but instead during short periods of time. At the same time the mobility of the suction nozzle of the inventive suction transporting device is not lower than in the conventional device due to the fact that periodical stickings of the suction nozzle to the surface for very short moments (fractions of a second) are not noticeable for a user. Both the mobility of the suction nozzle and the efficiency of transporting depend on the following parameters:

ratio between the time of exposition ($T_e$) and the time of closing $T_c$ within one cycle, each in turn depends on the ratio between the width of the inlet 9 and the width of the opening 13. This ratio can be changed by adjusting the initial width of the inlet 9, by turning the member 11 around the housing 7;

period T of one cycle which depends on the velocity of rotation of the valve body 12. It can be changed by adjusting the velocity of the drive 15 with the use of the regulator 16;

maximal reduction of the suction force which depends on the total area of the cross-section of the inlet 9. This area can be adjusted by displacing the member 10 together with the member 11 up and down along the housing 7. This operation sets up the initial area of the cross-section of the inlet 11 without changing its initial width which has been already preset.

The experiments with the regular canister vacuum cleaner provided with the modulator according to the present invention showed that the adjustment of all parameters takes just 1-2 minutes and does not need special skills. The ranges of the adjustment required for optimization of the operation for a particular design of a suction transporting device depend on its field of use, the type of carrying agent, the range of sizes and weights of particles to be transported, etc. The experiments conducted by the inventors with the suction cleaning device in accordance with the present invention showed that the range of required regulation of frequency was from 0 to 30 Hertz, and the range of required regulation for the time exposition was from 5% to 60% of the total period, that it the ratio in the numerator $T_e/T_c$ was from 5/95 to 60/40. The range of the regulation of the suction force reduction was within 0-35% of the maximum suction force developed in the nozzle of the suction cleaner.

The efficiency of the disclosed suction transporting device is significantly higher than in the suction transporting devices with conventional means for reduction of the suction force. The efficiency is higher in the second embodiment than in the first embodiment since practically 100% of the carrying agent passing through the suction device does the transporting job before being dumped back into the environment. The advantage of the first embodiment is that the suction force modulator can be used as an improving attachment with many existing suction transporting devices. An additional increase of the efficiency of the suction transporting device of the present invention is due to the agitating effect which occurs because of the amplitude variation of the suction force applied to the material, at least by the regulator of the drive. Periodical increase and decrease of forces acting on the particles to be transported creates a swinging action. Due to this action the particles can be better separated from the surface where they accumulate, and also better separated from each other. The agitating effect is stronger in the second embodiment of the invention, since not only the magnitude but also the direction or in other words the whole vector of the suction force changes periodically.

It will be understood that each of the elements described above, or two or more together, may also find a useful application in other types of constructions differing from the types described above.

While the invention has been illustrated and described as embodied in a suction transporting device, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

1. A suction transporting device for transporting a material, comprising suction means; a transporting line connected with said suction means and having an inlet for receiving a material to be transported and an outlet for discharging the material to be transported; and means for modulating a suction force of a suction produced in said transporting line by said suction means, said modulating means including a passage adapted to communicate the interior of said transporting line with atmosphere, an adjusting element operative for adjusting an initial area and shape of a minimal cross-section of said passage, and a valve mechanism including a drive, a speed controller for controlling a speed of said drive and a valve body connected with said drive and cooperating with said passage, wherein said drive comprises means for displacing said valve body, and said valve body comprises means for periodically changing the initial area and shape of the minimal cross-section of said passage.

2. A suction transporting device as defined in claim 1; wherein said modulator further comprises a housing around said passage connected with said transporting line and having a housing inlet and a housing outlet forming a part of said passage, said adjusting element further comprising a valve element including a first valve member which is longitudinally displaceable relative to said housing inlet and a second valve member which is longitudinally displaceable and is turnable relative to said housing inlet.

3. A suction transporting device as defined in claim 2, wherein said valve body is rotatable by said drive and has an inlet cooperating with said housing inlet and an outlet communicating with the interior of said transporting line.

4. A suction transporting device as defined in claim 3, wherein said second valve member and said valve body are turnable about the same axis, said first valve member and said second valve member being longitudinally displaceable along said axis.

* * * * *